May 9, 1961  J. P. SELBERG ET AL  2,983,341
SELF-ERECTING DERRICK
Original Filed May 4, 1950  9 Sheets-Sheet 1
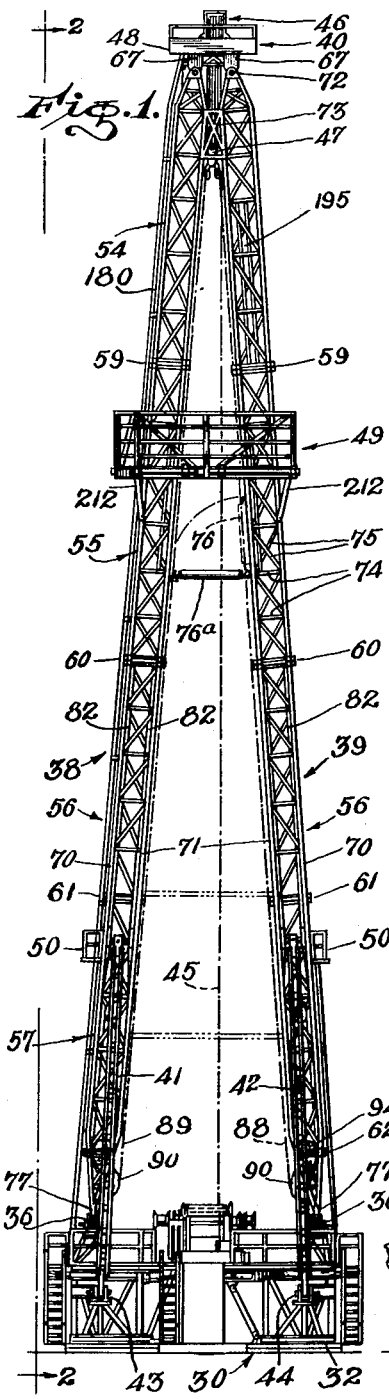
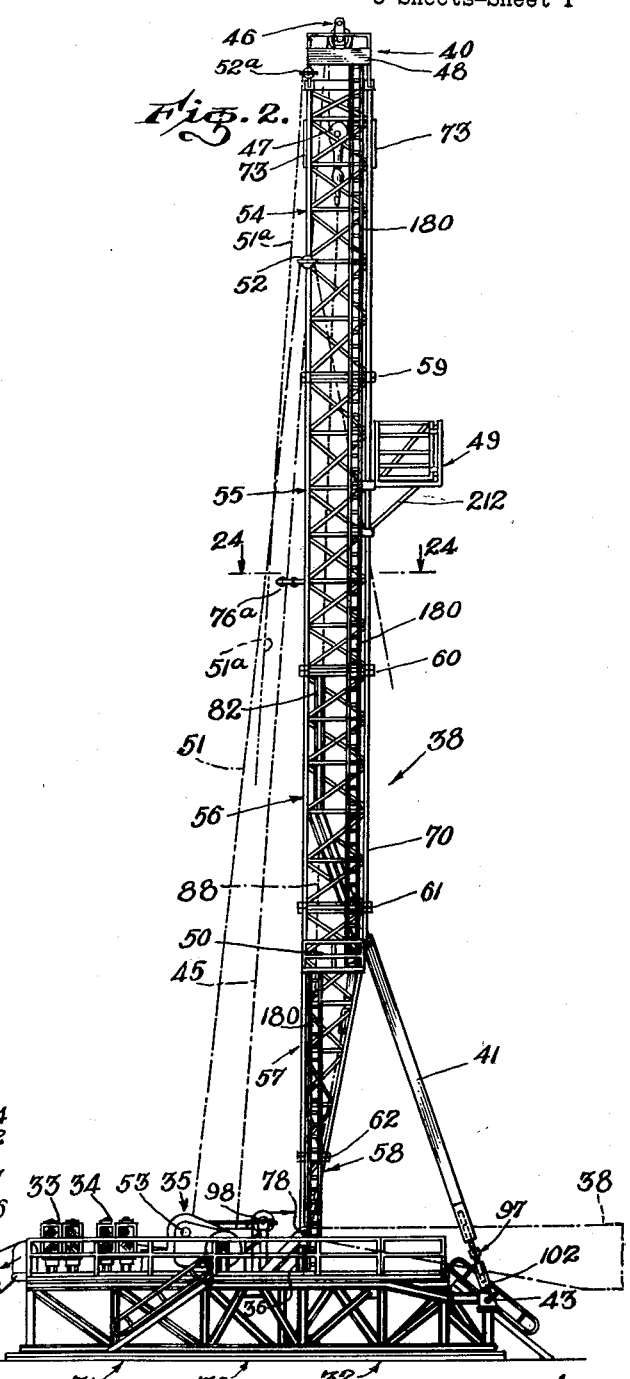
Inventor
John P. Selberg
William H. Griffith
By
Mulvider Mattingly & Huntley
Attorneys.

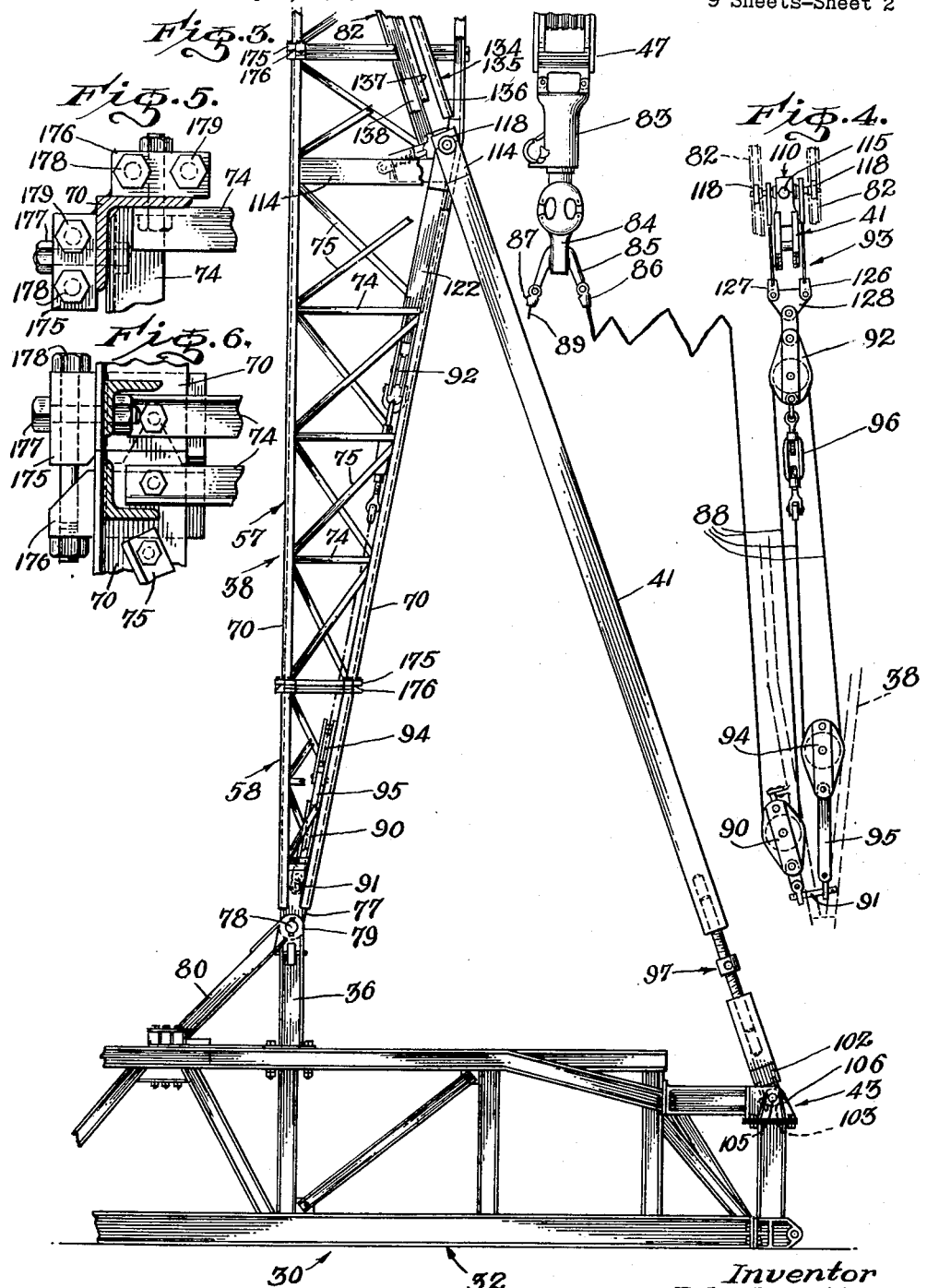

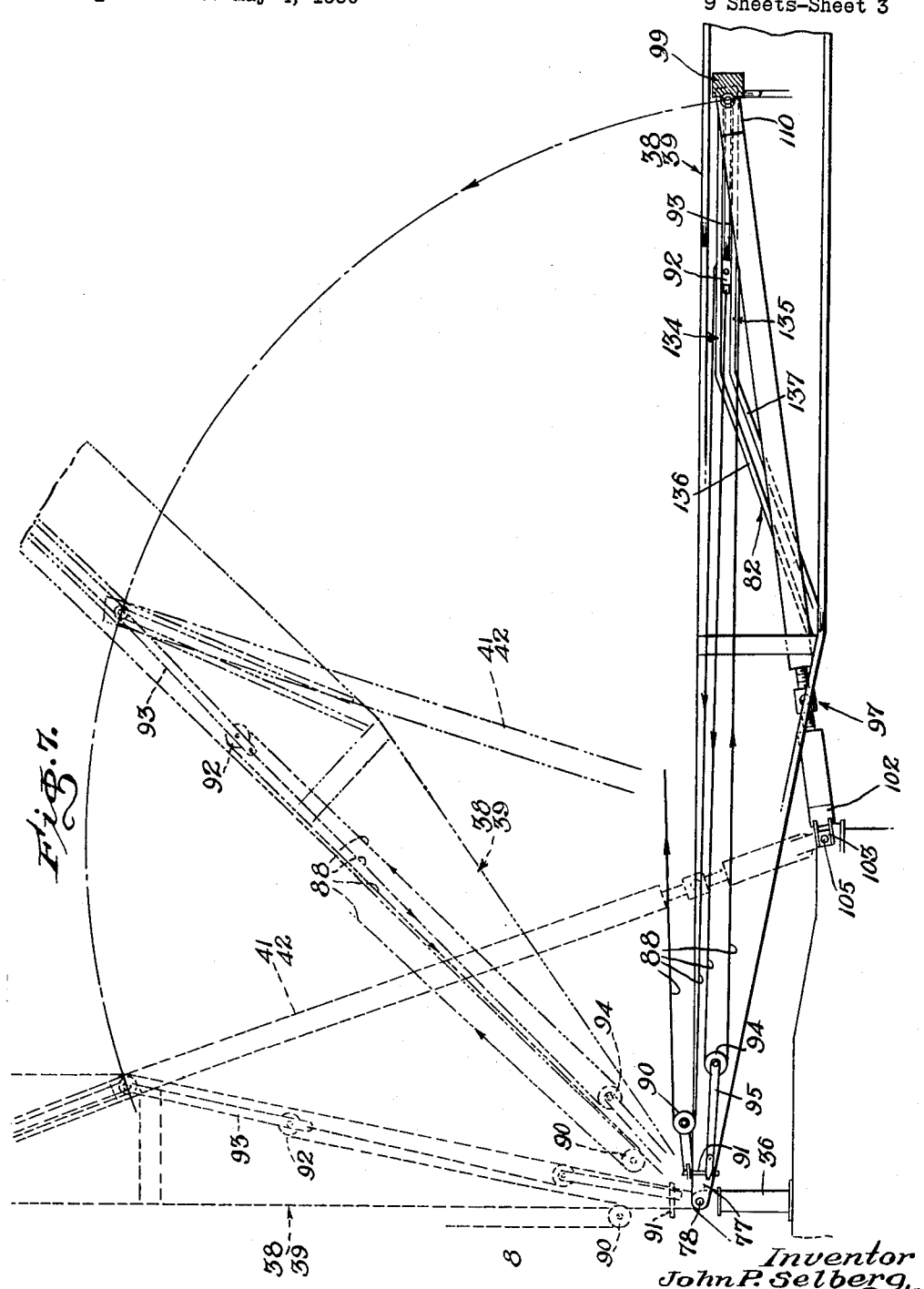

May 9, 1961   J. P. SELBERG ET AL   2,983,341
SELF-ERECTING DERRICK
Original Filed May 4, 1950   9 Sheets-Sheet 4
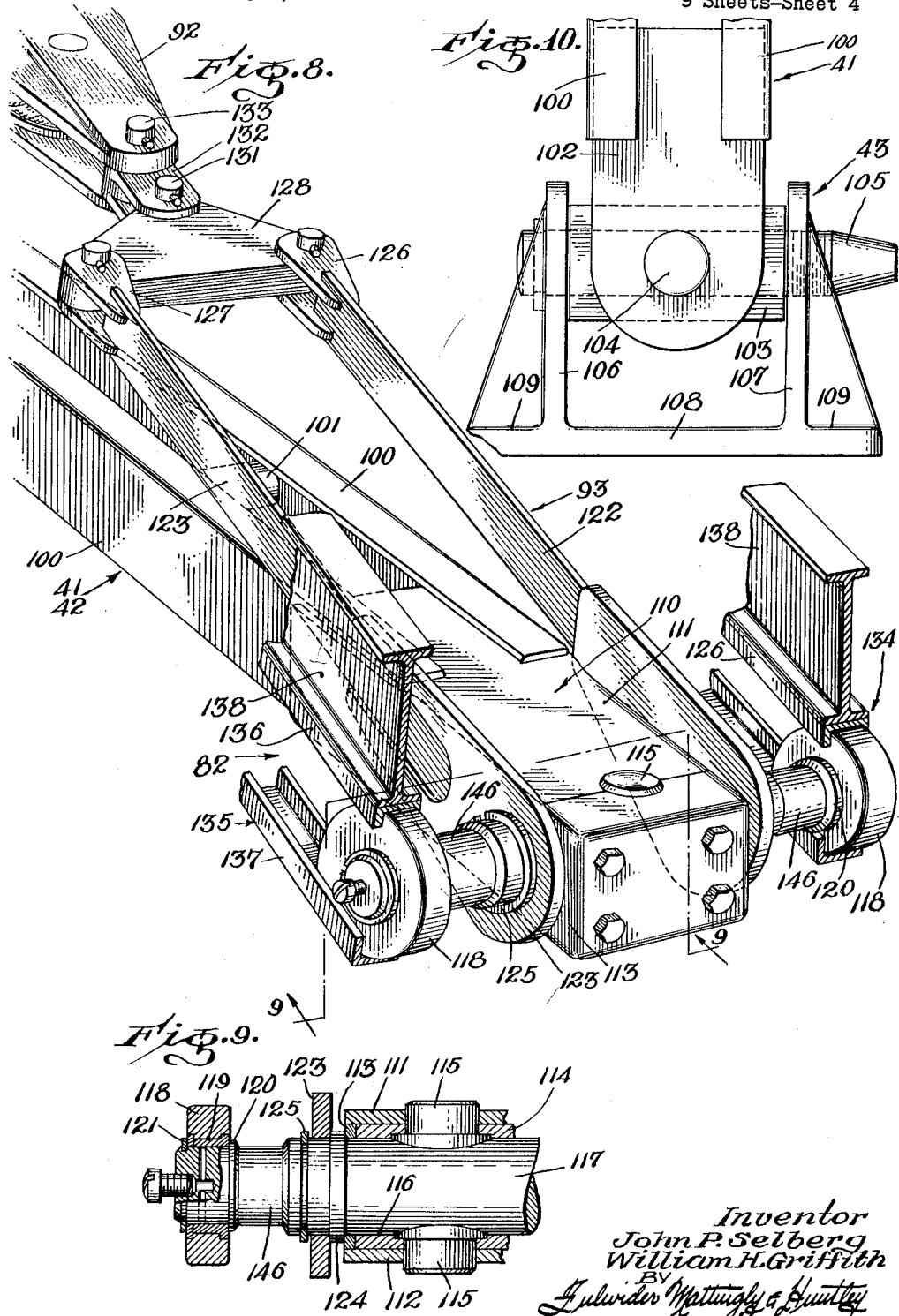
Inventor
John P. Selberg
William H. Griffith
BY
Fulwider Mattingly & Huntley
Attorneys.

May 9, 1961   J. P. SELBERG ET AL   2,983,341
SELF-ERECTING DERRICK
Original Filed May 4, 1950   9 Sheets-Sheet 5
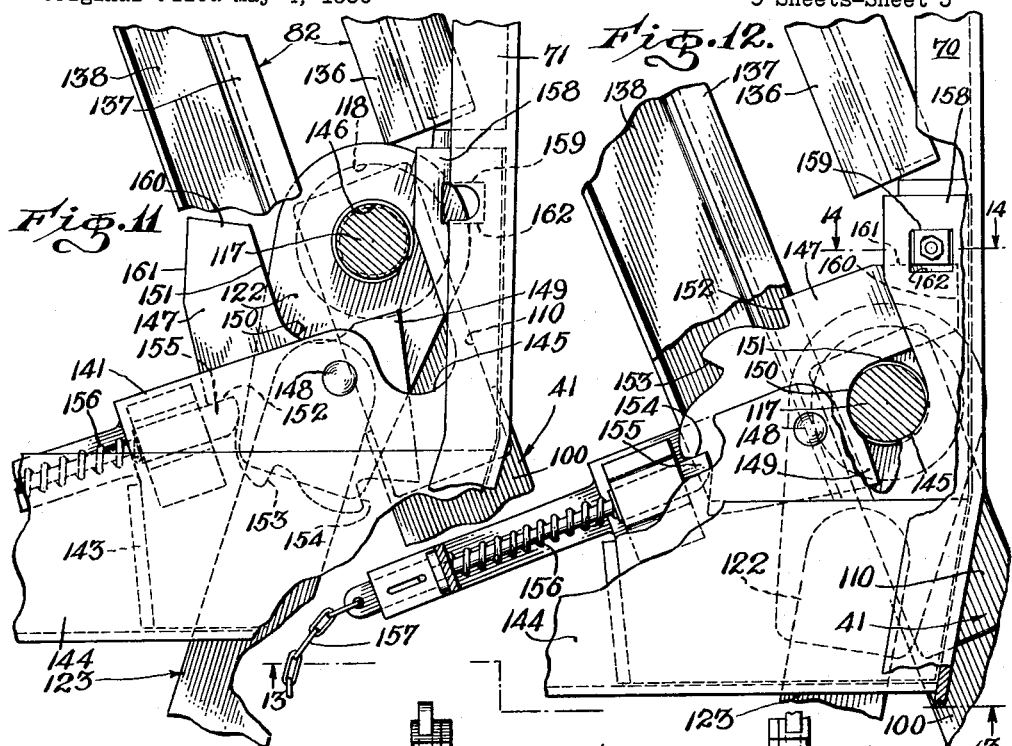
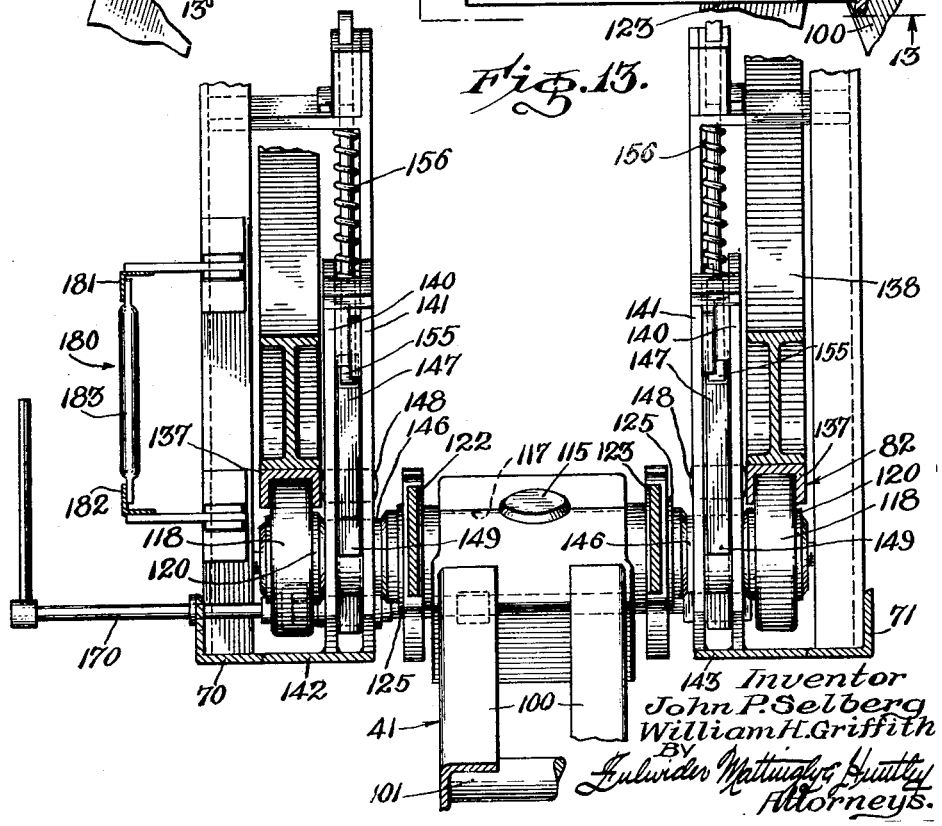
Inventor
John P. Selberg
William H. Griffith
BY
Fulwider Mattingly Huntly
Attorneys.

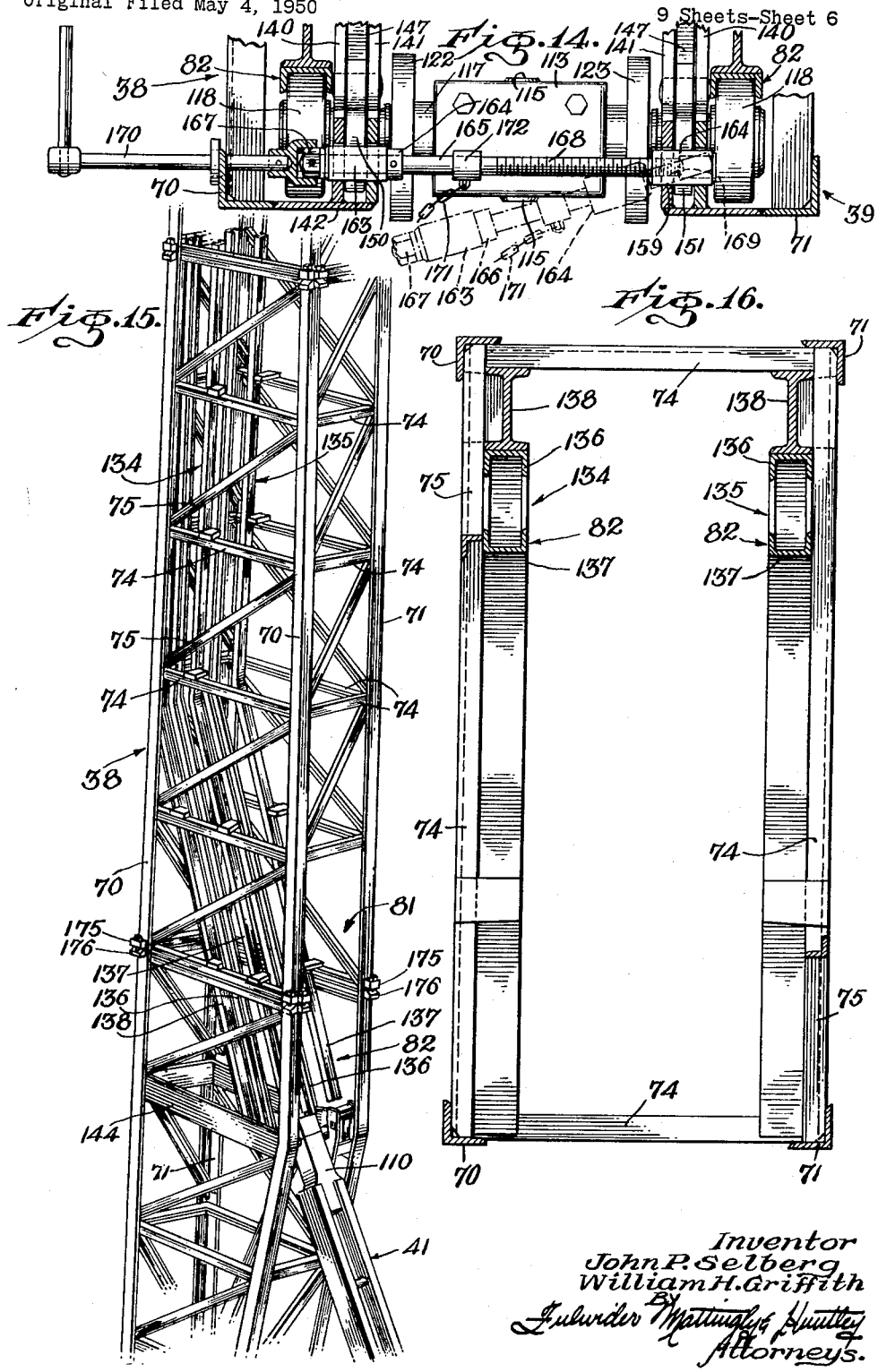

May 9, 1961 J. P. SELBERG ET AL 2,983,341
SELF-ERECTING DERRICK
Original Filed May 4, 1950 9 Sheets-Sheet 7

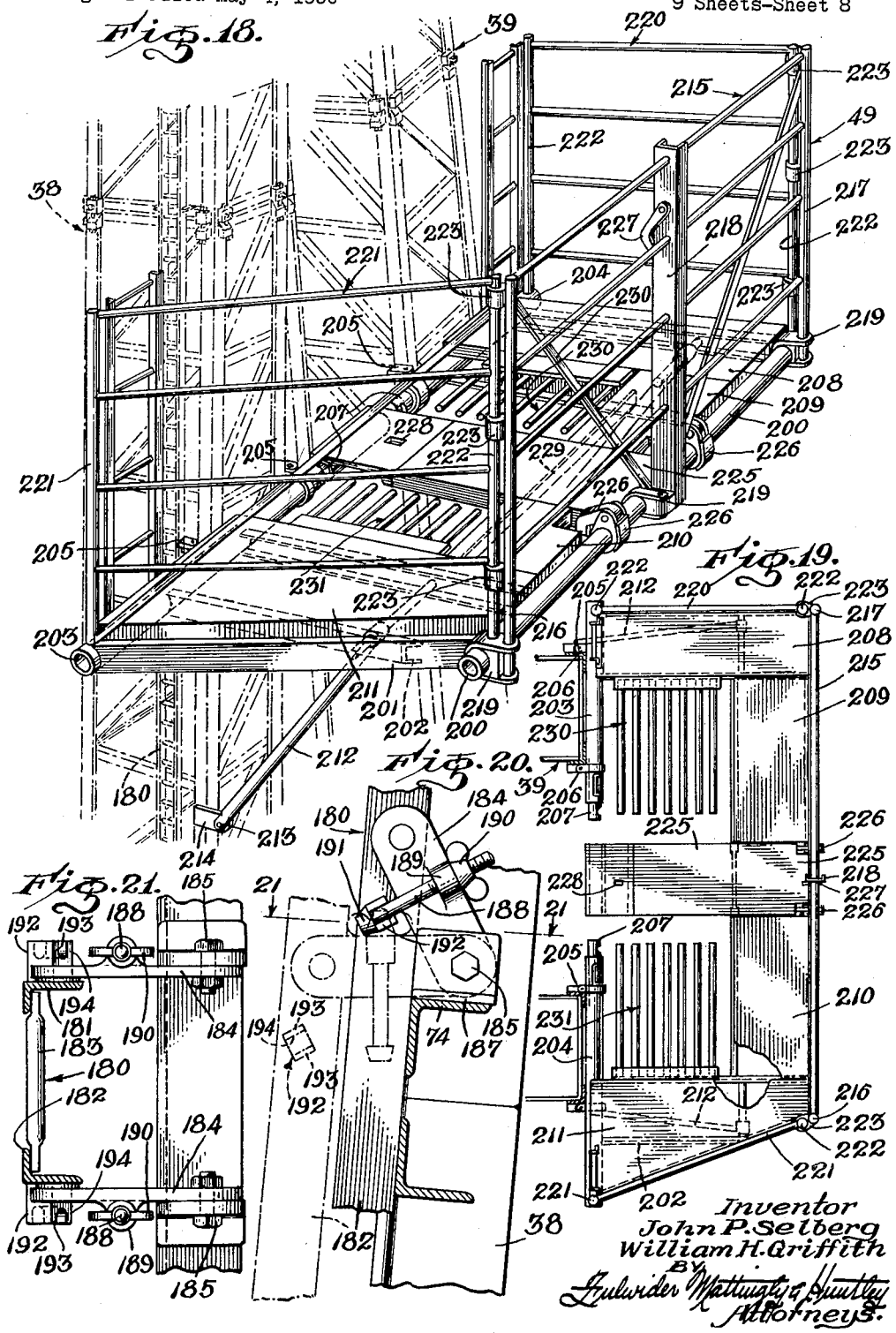

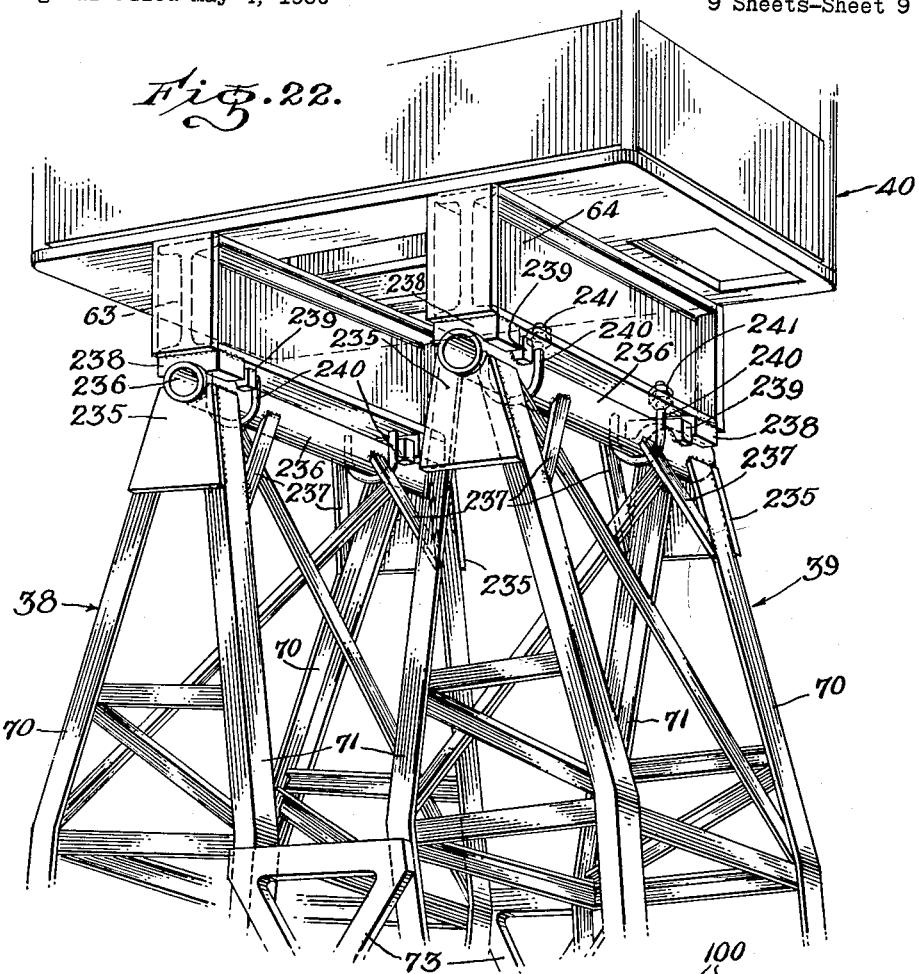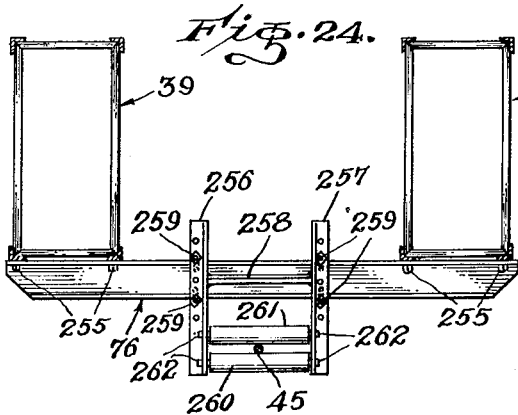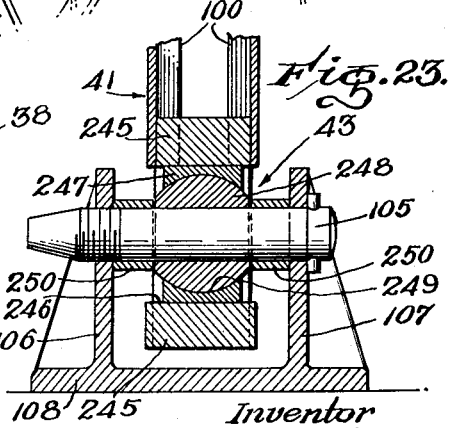

United States Patent Office 2,983,341
Patented May 9, 1961

2,983,341

SELF-ERECTING DERRICK

John P. Selberg, Los Angeles, and William H. Griffith, Long Beach, Calif., assignors, by mesne assignments, to Dresser Industries, Inc., Dallas County, Tex., a corporation of Delaware Original application May 4, 1950, Ser. No. 160,044. Divided and this application Feb. 1, 1956, Ser. No. 567,425

11 Claims. (Cl. 189—16)

This invention relates to well drilling rigs, and has particular reference to a self-erecting transportable derrick which finds particular utility when employed for the rotary drilling of deep wells such as oil and gas wells. This application is a division of our co-pending application Ser. No. 160,044, filed May 4, 1950, and entitled "Self-Erecting Derrick."

In the rotary drilling of deep wells, it is the general practice to erect at each well site a tall drilling derrick, the primary function of which is to provide hoisting and handling equipment for manipulating the drill string and drilling tools used during the drilling of the well. Once the well is brought into production, the tall drilling derrick is no longer required and is oftentimes dismantled and removed entirely from the well site, portable derricks being brought in from time to time whenever it is necessary to service the well pumping equipment.

Prior to this invention it was the general practice to erect such drilling derricks on the site, a piece at a time, the entire structure being fabricated and erected on the drilling site. Since such derricks are very tall, ranging upwards from 120 feet in height, the time and cost of erecting and then later dismantling such derrick structures is substantial.

Because of the time required to construct and dismantle drilling derricks of the character mentioned, a need has been felt for a prefabricated derrick structure which could be erected at the well site in a relatively short time and which was susceptible to being lowered and readily transported to a new site when the well was completed. Transportable derricks of this type are particularly desirable where a number of wells are to be drilled in succession in relatively adjacent locations. In an attempt to meet this need, a number of different types of portable derricks have been devised, the derrick shown in the patent to F. A. Funk, No. 2,345,253, issued March 28, 1944, being representative.

The transportable derricks devised prior to this invention are all characterized by certain disadvantages, the most notable of which is their lack of sufficient strength and rigidity required to meet satisfactorily the extremely heavy service requirements imposed upon drilling derricks when deep wells are drilled. This deficiency is met in part in some installations by the installation of an elaborate and expensive system of guy lines with their attendant disadvantages. Furthermore, most of the portable derricks known prior to this invention are of relatively limited height requiring the drill stem to be separated into stands comprising two lengths of drill pipe as distinguished from the three and four lengths of drill pipe going into a stand as used with conventional drilling derricks. The necessity for separating the drill stem into such relatively short stands substantially doubles the amount of work required in running a drill string into the hole and in removing the drill string from the hole when it is necessary to replace the drilling bit. Since a large percentage of the drilling time is used in running the drill string into and out of the hole, this substantial doubling of that portion of the time greatly extends the length of time required to drill the oil well and consequently correspondingly increases the loss of production and the cost of the well.

Additionally, the transportable derricks devised prior to this invention embody a construction and arrangement of parts and facilities which is substantially different from the arrangement found on standard drilling rigs, making it necessary to use somewhat modified drilling procedures in the operation of the rigs. This makes it necessary to teach the drilling crews new procedures using instrumentalities with which they are not entirely familiar, with a corresponding loss of efficiency and increase in cost.

Furthermore, the erection of the portable derricks devised prior to this invention is attended by considerable hazard. For example, those derricks which are erected from a horizontal position to a vertical position by hinging a prefabricated derrick structure about one side of the base of the derrick are so arranged that the center of gravity of the derrick passes the vertical line through the hinge just before the derrick reaches the upright position. This of course allows the hoisting lines to go slack, and requires the use of snubbing lines in order to prevent the tower from toppling over in the same direction and on the opposite side. This requires a degree of cooperation between the hoisting operator and the man handling the snubbing line which is seldom realized in practice. In like manner, when it is desired to lower the derrick it is necessary to pull the derrick in the lowering direction past the dead center position and then catch the derrick on the hoisting equipment which was used to erect the derrick in the first instance. The operation of catching the weight of the derrick as it passes the dead center position imposes extreme stresses on the hoisting equipment with the not too remote possibility that the line will part and allow the derrick to crash to the ground.

Finally, the self-erecting derricks known prior to this invention include auxiliary elevating devices which are used only for the purpose of erecting or lowering the derrick. These devices are so located as to interfere with the normal use of the derrick in its erected position, making it necessary to assemble the auxiliary structure before the derrick is erected, then dismantle that structure to allow the derrick to be used, then finally reassemble the auxiliary structure in order to permit the derrick to be lowered ready for transporting to a new location.

It is therefore an object of this invention to provide a self-erecting transportable derrick which is particularly adapted for use in the rotary drilling of deep wells, and which overcomes the above-noted disadvantages by incorporating features of construction making the derrick useful for substantially any rotary drilling operation which could be performed with a conventional derrick structure.

It is also an object of this invention to provide a self-erecting transportable derrick of the character mentioned in the preceding paragraph which is prefabricated as a plurality of individual sections which may be individually packed and shipped when the derrick is to be sent to a distant location.

It is an additional object of this invention to provide a self-erecting derrick of the character set forth in the preceding paragraph in which said individual sections may be joined together to form a plurality of sub-assemblies, in which form the derrick may be readily transported over reasonable distances.

It is another object of this invention to provide a self-erecting derrick of the character set forth in the preceding paragraph in which the individual parts of said sub-assemblies are adapted to be folded in side-by-side or nesting relation with each other to minimize the space occupied by such parts when the sub-assemblies are transported from one drilling site to another.

It is a still further object of this invention to provide a self-erecting transportable derrick of the character hereinbefore described which includes an erecting mechanism so constructed and arranged with reference to the rest of the derrick structure as to be used as a part of the derrick structure itself after the derrick is erected and ready to be placed in operation.

It is also an object of this invention to provide a derrick of the character set forth in the preceding paragraph in which all of the mechanism employed in erecting the derrick is self-contained within the derrick structure so as to accompany the derrick when it is transported from one location to another to thereby be immediately available for use in erecting the derrick at the new location.

It is a further object of this invention to provide in a self-erecting derrick of the character described hereinbefore an erecting mechanism wherein the power for erecting the derrick is taken from the conventional draw works such as is used in the usual drilling operations.

It is additionally an object of this invention to provide a self-erecting derrick of the character hereinbefore mentioned which is arranged to be erected from a prone to an upright position by rotating the derrick about pivot axes disposed at the base of the derrick, and in which the center of gravity of the derrick remains continuously on the same side of the pivot axis and does not pass the dead center position as is characteristic of the prior art structures.

Another object of this invention is to provide a self-erecting derrick of the character hereinbefore mentioned which includes an automatic latch mechanism cooperating with the erecting mechanism and operating to hold the derrick in a fixed position when the raising of the derrick has preceded to the final upright position of the derrick structure to thereby obviate the necessity of employing the hoisting equipment to hold the derrick in an erected position until a manual lock can be applied.

It is also an object of this invention to provide an automatic latch mechanism of the character set forth in the preceding paragraph which includes a manually operated safety lock which may be applied after the operation of the automatic latch to insure and protect against the inadvertent release of the automatic latch.

It is a still further object of this invention to provide a self-erecting derrick of the character set forth in the preceding paragraphs which includes a base pivot means defining an axis about which the derrick is rotated during erection from a prone horizontal position to a final erected vertical position, and wherein a raising leg is provided having one end secured to a fixed pivot and having the other end bearing against the underside of the derrick structure so that a force applied horizontally to the erecting leg will produce a couple tending to rotate the erecting leg to a vertical position and thereby apply to the derrick a couple tending to also rotate the derrick to a vertical position, said fixed pivot for said raising leg being disposed at an elevation lower than said pivot for the derrick base.

It is another object of this invention to provide an erecting structure of the character set forth in the preceding paragraph which includes a trackway carried by the derrick structure and which is engaged by the moving end of the erecting leg to thereby provide for efficient application of the erecting force to the derrick structure.

It is also an object of this invention to provide an erecting structure of the character set forth in the preceding paragraph in which the trackway is situated at the upper surface of the horizontally disposed derrick and wherein said trackway includes a downwardly inclined portion to thereby minimize the dimensions of the aperture through which the erecting leg extends to meet the trackway.

It is a still further object of this invention to provide a self-erecting derrick of the character set forth hereinbefore which includes a removable folding pipe rack platform so arranged as to permit the parts thereof to be folded and secured in close abutting relation to each other to minimize the space occupied by said platform during transportation of the derrick from one drilling site to another.

Other objects and advantages of this invention will be apparent from a consideration of the following specification, read in connection with the accompanying drawings, wherein:

Fig. 1 is a end elevational view of the preferred embodiment of this invention as seen from the pipe rack side;

Fig. 2 is a side elevation of the structure shown in Fig. 1 and as viewed from the driller's side;

Fig. 3 is an enlarged elevational view of the base portion of the derrick as seen from the driller's side, and showing the relation between the pivot axis for the derrick and the raising leg;

Fig. 4 is a fragmentary diagram illustrating the reeving of the hoisting tackle which connects the traveling block to the upper end of the raising leg for applying to the raising leg the erecting forces developed through movement of the traveling block;

Fig. 5 is a horizontal sectional view through a portion of one of the main column members illustrating the detachable connection used to join the separable sections from which the mast members of the derrick are assembled;

Fig. 6 is a fragmentary vertical sectional view of the structure shown in Fig. 5 and illustrating additional details of construction;

Fig. 7 is a diagrammatic view illustrating the mode of operation of the erecting mechanism and illustrating the manner in which the erecting force applied to the raising leg serves to rotate the derrick from an initial prone position to a final upright position;

Fig. 8 is a fragmentary perspective view illustrating the construction of the upper end of the raising leg, and illustrating the apparatus used to connect the raising tackle to the raising leg;

Fig. 9 is a fragmentary longitudinal sectional view taken substantially along the plane 9—9 of Fig. 8 and illustrating the construction of the roller, trunnion, and link mechanism associated with the outer end of the raising leg;

Fig. 10 is an elevational view illustrating the construction of the trunnion used to pivotally secure the lower end of the raising leg to the derrick sub-structure;

Fig. 11 is a side elevational view of an automatic latch mechanism used to secure the raising leg in the raised position of the derrick, Fig. 11 illustrating the positions occupied by the various parts as the raising leg approaches the final erected position;

Fig. 12 is a fragmentary view similar to Fig. 11 but showing the positions occupied by the parts when the raising leg has been moved to its final position;

Fig. 13 is a fragmentary sectional view taken at right angles to the planes of Figs. 11 and 12, and further illustrating the cooperative relation between the upper end of the raising leg and the automatic latch;

Fig. 14 is a fragmentary sectional view taken substantially along the line 14—14 of Fig. 12, and illustrating the construction of a safety lock used to secure the automatic latch in the latched position;

Fig. 15 is a fragmentary perspective view of one of the derrick masts illustrating the construction and arrangement of the track structure to which the erecting force is applied by the upper end of the raising leg;

Fig. 16 is a cross sectional view of the structure shown in Fig. 15 and illustrating the construction and arrangement of parts defining the trackway for guiding the upper end of the raising leg;

Fig. 18 is a fragmentary perspective view illustrating the construction of the folding pipe rack platform;

Fig. 19 is a plan view of the platform shown in Fig. 18;

Fig. 20 is a fragmentary side elevational view with parts shown in section illustrating the construction and operation of a locking and support mechanism providing for the folding of the ladder in close abutting relation with the side of the derrick mast when the same is arranged for transportation;

Fig. 21 is a fragmentary cross sectional view taken substantially along the line 21—21 of Fig. 20;

Fig. 22 is a fragmentary perspective view illustrating a modified form of water table construction and an alternative means for securing the water table to the upper end of the derrick;

Fig. 23 is a vertical sectional view showing a modified form of trunnion construction for use at the lower end of the raising leg; and Fig. 24 is a fragmentary horizontal sectional view illustrating the construction of a fast line stabilizer.

Figure 17:
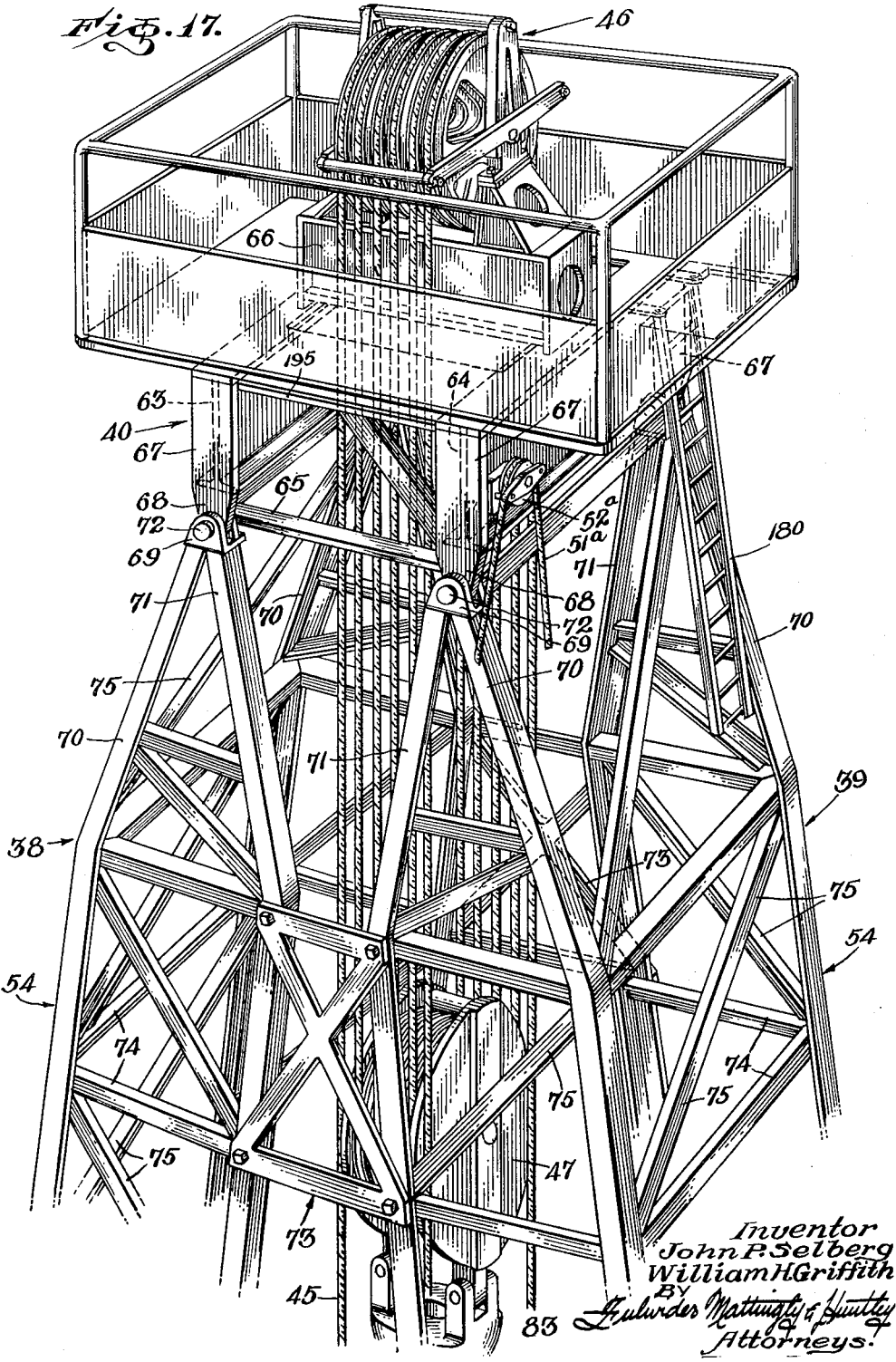
Fig. 17 is a fragmentary perspective view illustrating the construction of the upper end of the assembled derrick structure and showing the manner of attachment of the water table and crown block assembly to the upper end of the derrick masts.

Referring to the drawings, the preferred embodiment of the invention is illustrated generally in Figs. 1 and 2 as including a base or sub-structure 30 which may consist of an engine base portion indicated generally at 31 and a derrick base portion indicated generally at 32 and preferably formed integrally with the engine base portion 31 as a part of the integral base structure 30.

The engine base portion 31 serves to carry the instrumentalities used during the operation of the derrick in the drilling of a deep well bore, which instrumentalities may include a prime mover 33 for driving the slush pumps (not shown) and a prime mover 34 for driving a conventional draw works 35.

The derrick base portion 32 includes a pair of rear derrick base pedestals 36 and 37 from which rise a pair of masts indicated generally at 38 and 39 and which together define a derrick tower. When viewed from the driller's side of the structure as in Fig. 2, the masts 38 and 39 rise vertically, whereas when viewed from the pipe rack side of the structure as in Fig. 1, the masts 38 and 39 converge upwardly and have their upper ends interconnected by a water table structure indicated generally at 40. A pair of raising legs 41 and 42 are each pivotally connected at their lower ends to front raising leg pedestals 43 and 44 disposed forwardly of the rear pedestals and on the pipe rack side of the derrick floor. The raising legs 41 and 42 extend upwardly and inwardly to each of the masts 38 and 39 to which the upper ends of the legs 41 and 42 are secured when the mast is erected as shown in Figs. 1 and 2.

It will be understood that the center line of the well lies midway between the masts 38 and 39 as viewed in Fig. 1, and lies just to the right of the pedestals 36 and 37 as viewed in Fig. 2—that is, extending through the central portion of the water table 40.

The hoisting mechanism which is used during the drilling of the well to carry the weight of the drill string and for running the drill string into and out of the hole comprises the draw works 35 which provides a cable drum (not shown) from which a fast line 45 extends upwardly and between the masts 38 and 39 to pass over one of a plurality of sheaves comprising a crown block assembly 46. The line passes from the crown block assembly 46 around the sheaves of a traveling block 47 (Fig. 17) encircling the corresponding sheaves of the crown block and the traveling block a number of times in the conventional fashion. The dead end of the hoisting line is carried from the crown block to the base of the derrick structure, and is anchored there in a conventional manner as by being secured to the base pedestal 36.

The assembled and erected derrick also includes a crown or safety platform 48, a pipe racking platform 49, an offset platform 50, and suitable operating auxiliaries such as a catline 51 which passes over a catline sheave 52 and which may be snubbed around a cathead 53 forming a part of the draw works 35.

The derrick structure thus generally described is prefabricated as a plurality of individual sections adapted to be transported individually to the well site and there joined to make up the complete derrick structure. The masts 38 and 39 are separate structures and each comprises a top section 54, an upper intermediate section 55, a middle intermediate section 56, a lower intermediate section 57, and a base section 58. The mentioned sections are adapted to be joined to each other in the field in the manner indicated in Figs. 1 and 2 at splicing locations indicated on the drawings by the reference characters 59, 60, 61, and 62, the detail of the splicing mechanism used at these locations being shown in Figs. 5 and 6 and described in detail hereinafter.

As is best shown in Fig. 17, the upper ends of the masts 38 and 39 are interconnected through the water table assembly 40 carried by the upper ends of the masts. The water table assembly 40 comprises a pair of water table beams 63 and 64 disposed in parallel spaced relation to each other and intertied by means of horizontal braces 65 and the crown block pedestal beam assembly shown at 66. The ends of the beams 63 and 64 carry downwardly extending plates 67 which are suitably secured to the beams 63 and 64 as by welding. The plates 67 define downwardly projecting tongues 68 which are received between the arms of bifurcated socket members 69 secured to the upper ends of the masts 38 and 39, column members 70 and 71 defining opposite sides of the masts 38 and 39 converging inwardly as shown in Fig. 17 to meet at the bifurcated socket members 69 to which they are suitably secured as by welding. Aligned bores provided in the arms of the socket members 69 and the tongues 68 receive pivot pins 72 serving to pin the water table assembly to the upper ends of the masts.

The interconnection of the upper ends of the masts through the water table assembly 40 is reinforced by means of prefabricated X-brace members indicated generally at 73 in Fig. 17, these members being secured to the side faces of the column members 70 and 71 of each of the masts, as is shown in the drawings.

As is best shown in Figs. 15, 16, and 17, each of the masts 38 and 39 has a rectangular cross section defined by two pairs of the vertically extending column members 70, 71, the column members 70 defining the outer face of the mast, and the column members 71 defining the inner face thereof. The column members 70 and 71 are mutually interconnected by means of a plurality of horizontally disposed, circumferentially extending girts 74 spaced at substantially uniform intervals along the height of the mast. Diagonal braces 75 are extended diagonally across the rectangular openings defined by adjacently disposed girts.

As may be seen by reference to Fig. 17, no horizontal girts between the inner face columns 71 are employed in the top mast sections 54. These sections accordingly have a rectangular C-shaped cross section disposed with the open sides of the C-shapes facing each other to define an open area through which the traveling block 47 may pass in the upper portion of its travel. To compensate for the loss of stiffness resulting from this omission of the horizontal girts, the girts on the other three sides of each mast are made considerably heavier and stronger than are the corresponding girts employed in the other sections of the structure.

Preferably, but not necessarily, the girts, diagonal braces, and the columns are all formed of structural steel angles which may be weatherproofed, either by galvanizing or painting, as may be desired.

As will be made more apparent hereinafter, the pipe racking platform 49 is secured to both of the masts 38 and 39 and thus provides a cross tie between the two masts at the location of the pipe racking platform tending to stiffen the structure and impart additional rigidity thereto. In addition to the pipe racking platform, there is preferably provided a removable horizontal strut 76 which, when installed, interconnects the columns on the draw works side of the derrick to provide additional stiffening and to serve as a catcher to prevent stands of drill pipe from falling out of the otherwise open side of the derrick. The strut 76 may be pivoted at one end and detachably secured at the other to permit the strut to be folded against one side of one mast during transportation of the derrick to a new location, although preferably the strut 76 is merely bolted to all four of the columns on the draw works side. Also, as is fully described hereinafter with reference to Fig. 24, the strut serves to support a fast line stabilizer 76a for guiding and preventing whipping of the fast line 45 during drilling operations.

As is best shown in Fig. 3, the lower intermediate section 57 and the base section 58 of the masts 38 and 39 are tapered in that the inner face columns 71 are inclined outwardly to meet the vertically extending outer face columns 70 in a trunnion member 77. In addition, the outer face column members 70 and the inner face column members 71 are inclined toward each other in the base section 58 so that all four column members converge and join at the trunnion member 77. The trunnion member 77 is hingedly connected by a horizontal hinge pin 78 to a swivel member 79 which is in turn mounted upon the base pedestal 36 for angular adjusting movement about a vertical axis. A plurality of diagonal braces 80 extending outwardly and downwardly toward the draw works from the top of the base pedestal 36 and suitably secured to the upper members of the sub-structure 30 reinforce the base pedestal 36 sufficiently to withstand any overturning forces that may be applied thereto. The braces 80 all extend away from the center line of the well bore so as to leave a large and unencumbered working space around the rotary table.

The structure used to detachably interconnect the various sections 54—58 of the masts 38 and 39 is illustrated in detail in Figs. 5 and 6 with reference to one of the mast column members 70, it being understood that identical constructions are used at all four corners of each of the two masts. Each of the attachment means includes two pairs of blocks 175 and 176, one of the pairs being situated at the lower end of one section and the other pair being situated at the upper end of the section next below. The blocks 175 are positioned on one side face of the structural angle column member 70, while the blocks 176 are positioned on the other side face of the angle. The blocks are preferably secured to the column members as by welding, and each of the blocks 175 and 176 is provided with a pair of spaced vertically disposed apertures permitting draw bolts 178 and 179 to be passed downwardly through the aligned apertures in the corresponding block of the upper and lower pairs, the draw bolts 178 and 179 being used to draw the two sections into secure abutting engagement with each other. It has been found in practice that this form of attachment permits ready alignment of the column members and allows said members to be secured to each other with a minimum expenditure of time and effort.

Horizontally extending bolts 177 passed through suitable apertures in the blocks 175 and 176 serve to secure the girts and braces to the mast columns. By this means, a more compact framing is obtained at the splice location and eccentric bracing is avoided.

The erecting mechanism which is employed to raise the derrick from an initial prone position as represented diagrammatically by the solid lines in Fig. 7, to an erect position, as represented by the erect dotted line view in Fig. 7, comprises the raising legs 41 and 42 in cooperation with the masts 38 and 39 and the derrick base portion 32, together with the tackle system which is shown in Fig. 4 for developing the erecting force. When the derrick is in the prone position, the raising legs 41 extend outwardly from their lower pivots 43 and into the confines of the masts 38 and 39 through suitable openings 81 provided by the omission of certain horizontal girts, as may be seen in Fig. 15. The outer ends of the raising legs 41 are provided with a roller assembly (to be described in more detail hereinafter) which engages track structures 82 secured to each of the masts 38 and 39.

The traveling block 47 is provided, as is usual, with a swivel 83 and hook 84 to which is attached (during the erecting operation) a sling yoke 85. The sling yoke 85 has pivotally attached thereto a pair of cable sockets 86 and 87 connected to the ends of the wire lines or cables 88 and 89 associated respectively with the masts 38 and 39. The cable 88 extends downwardly and outwardly from the hook 84 to pass around a swivel block 90 secured as by means of an anchor pin 91 to the trunnion member 77. From the swivel block 90 the line 88 passes upwardly within the outline of the mast 38 and around an upper raising block 92. The upper raising block is connected by means of a cross head yoke assembly indicated generally by the reference character 93, and described in more detail hereinafter, to the outer end of the raising leg 41. After passing around the upper raising block 92, the wire line 88 passes downwardly within the confines of the mast 38 and around an intermediate raising block 94 which is secured as by means of a suitable anchor link 95 to the aforementioned anchor pin 91. After passing around the middle raising block 94, the line 88 again passes upwardly within the interior of the mast 38 and is connected to the frame of the upper raising block 92. The wire line 89 connected to the yoke 85 and associated with the other mast 39 is rigged in a precisely similar manner.

A turnbuckle 96 may be connected between the frame of the block 92 and the end of the line 88 as a means by which the effective length of the wire line 88 may be adjusted to center the traveling block 76 between the masts 38 and 39 when both lines 88 and 89 are taut.

Referring now to Figs. 2, 4, and 7, it will be seen that by winding the fast line 45 of the main hoist upon the hoisting drum of the draw works 35, the traveling block 47 will be moved outwardly toward the crown block when the mast is in the prone position. This will cause the line 88 to move outwardly as is represented in solid lines in Fig. 7. The reeving of this line over the blocks 90, 92, and 94 constitutes a tackle system interconnecting the outer end of the raising leg 41 with the base pedestal 36. The tackle system thus applies a tension force between the outer end of the raising leg 41 and the base pedestal 36 along a line which is substantially horizontal and which passes above the lower pivot 43 for the raising leg 41, thus producing a couple tending to rotate the raising leg 41 in a counterclockwise direction as viewed in Fig. 7. Obviously, the tackle systems may include a greater or smaller number of line-parts extending between the pulleys 92 and 94 depending upon the mechanical advantage desired.

The cross head roller assembly at the outer end of the raising leg 41 bears against the track 82 and serves to resolve the aforementioned rotative couple into an upwardly directed force applied to the mast 38 at the point of engagement of the roller assembly with the track 82. This upward force acting at a considerable distance from the pivot 78 causes the mast 38 to be rotated in a counterclockwise direction about that pivot.

The erecting rotation of the mast 38 is accompanied by a simultaneous rotation of the mast 39 by virtue of the interconnection of those masts at the water table assembly 40, and by reason of the raising leg 42 shown in Fig. 1 applying to the mast 39 an equal and simultaneous raising force. The dotted line positions shown in Fig. 7 represent the relative orientations of the masts and the raising legs during the motion from the initial prone position to the finally erected position, such finally erected position being also represented in Fig. 3.

The raising legs 41 and 42 are preferably made adjustable in length by any suitable adjustment means such as that represented at 97 in Fig. 3 to provide for adjusting the verticality of the masts when the parts occupy their fully erected positions.

Certain types of draw works 35 provide a hydrodynamic brake immediately in front of the hoisting drum for the fast line 45. The fast line 45 extends horizontally away from the derrick base when the derrick is in a prone position, and in order to prevent interference between the fast line in this position and the hydrodynamic brake, the draw works is preferably provided with an elevated idler roller 98 which serves to elevate the fast line 45 a distance sufficient to clear the aforementioned brake.

As is best shown in Figs. 8 through 14, the raising legs 41 and 42 each comprise a pair of channel members 100 disposed with their open sides facing and interconnected at frequent intervals along their length by lateral stiffeners 101. The lower ends of the channels 100 receive and are suitably secured as by welding to a lower end terminal 102 forming a part of the raising leg pivot assembly 43 hereinbefore mentioned. The terminal member 102 is bifurcated to receive between the arms thereof a trunnion block 103 to which the terminal member 102 is pivotally attached as by means of a transverse pivot pin 104. The trunnion block 103 is in turn pivotally supported, as by means of a pivot pin 105, between the upstanding arms 106 and 107 of a base shoe 108. The base shoe 108 includes flange portions 109 adapted to be secured as by bolts, welding, or otherwise to the raising leg pedestal.

At their outer ends the channels 100 are secured to a box-like structure 110 fabricated as by welding from upper and lower plates 111 and 112 and side plates 113. Within the box so defined there is positioned a trunnion block 114 carrying vertically extending pintles 115 passing through suitable apertures in the upper and lower plates 111 and 112 and serving to journal the trunnion block 114 for limited angular rotation about the vertical axis of the pintles 115. The trunnion block 114 is bored as indicated at 116 to receive a cross shaft 117 upon the outer ends of which are rotatably mounted suitable rollers 118. The rollers 118 are preferably fitted with bushings or anti-friction bearings 119 and are axially held between a shoulder 120 on the cross shaft 117 and a lock ring 121 received in a suitable annular groove formed in the outermost end of said shaft.

A pair of cross head links 122 and 123 are bored to pass over the shaft 117 at opposite sides of the box-like structure 110. In those positions the links 123 are axially restrained between a shoulder 124 formed on the shaft 117 and a spring snap ring 125 received in a suitable annular groove formed in said shaft. The outer ends of the links 122 and 123 are provided with pivot shackles 126 and 127 which are pivotally secured to a yoke member 128 as by pivot pins 129 and 130. The yoke 128 is pivotally joined as by means of a pivot 131, line 132, and pivot 133 to the frame of the upper raising block 92. The cross head links 122 and 123, together with their attachment means just described, thus serve to apply directly to the cross shaft 117 the tension forces which are exerted by the raising tackle in response to movement of the traveling block.

The rollers 118 are adapted to move along the trackway 82 hereinbefore described. As more clearly appears in Figs. 8, 15, and 16, the trackway 82 comprises a pair of tracks indicated generally by the reference characters 134 and 135, and associated respectively with one or the other of the rollers 118. Each of the trackways 134 and 135 comprises an upper channel member 136 and a lower channel member 137. The upper channel member 136 is secured to the face of an I-beam 138 which is suitably secured as by welding to the structure of the mast 38 or 39, as the case may be. The channel 137 is turned on its side and also secured to the structure of the mast. This channel serves as a catcher to carry the upper end of the raising leg 41 when the same is not applying a lifting force to the mast.

The trackways 134 and 135 extend vertically and parallel to the length of the mast 38 along the draw works side thereof for substantially one-half of their length, the lower portion of the trackways being inclined toward the pipe rack side of the derrick and terminating near the pipe rack face of the mast. By making the tracks 134 and 135 of two angularly disposed portions as described, the window 81 through which the raising leg 41 extends may have a minimum vertical dimension which is much less than would be the case were the trackways 134 and 135 extended vertically for their entire length.

When the mast is raised to its erected position, the rollers 118 have been caused to move downwardly along the trackways 134 and 135 to the lower ends thereof. At this location on each of the masts 38 and 39 there are provided automatic latching devices which serve to secure each of the cross shafts 117 to the associated mast at that location so that the erecting force may be released without the derrick returning to its original prone position. The latching mechanism is duplicated for each end of the cross shaft 117, and the construction of one is illustrated in Figs. 11 through 14.

As may be seen from an inspection of the enumerated figures, each latching mechanism comprises a frame formed of spaced parallel plates 140 and 141 disposed in vertical planes parallel to the inside and outside faces of the mast 38. These plates are secured to supporting members 142 and 143, welded or otherwise suitably attached to the mast columns 70 and 71. At the location of the latching mechanism, as may be seen in Fig. 15, the usual horizontal girts 74 are replaced by heavy brace members 144 serving to further support and stiffen the latch frame 140—141.

The plates 140 and 141 are shaped as shown in Figs. 11 and 12 to define aligned semi-circular notches 145 which are so positioned at the ends of the trackways 134 and 135 as to receive a slightly reduced diameter portion 146 of the cross shaft 117 when the raising leg 41 is moved to the limit of its travel, the shaft portion 146 being disposed between the roller 118 and the cross head links 122 and 123.

Between the plates 140 and 141 there is rotatably supported a pivoted latch member 147, a pivot pin 148 passing through the plates 140 and 141 and through the member 147 providing a rotational mounting of the latch member. The latch member 147 is shaped as shown in Figs. 11 and 12, and includes an actuating projection 149 initially disposed within the notch 145 in a position to be engaged by the cross shaft portion 146 as that portion is moved into seating relation in the notch 145. The engagement of the shaft portion 146 with the operating projection 149 forces a clockwise rotation of the latch member 147 which serves to move it from the position shown in Fig. 11 to the position shown in Fig. 12, in which latter position the shaft portion 146 is confined within the notch 145 by a portion of the latch member 147 which defines a surface 150—151 extended in such a direction as to lie substantially at right angles to the direction of movement of the shaft 146.

The side of the latch member 147 opposite the operating projection 149 is formed with three ratchet teeth 152, 153, and 154 which are positioned to be engaged in three separate angular positions of the member 147 by a pawl 155. The pawl 155 is disposed between the plates 140 and 141 and is mounted for axial sliding movement into and out of engagement with the notches defined by the ratchet teeth 152–154. The pawl 155 is spring urged inwardly as by a compression spring 156, and is provided with a chain 157 or similar flexible tension means which extends to the floor of the derrick to permit the pawl 155 to be withdrawn from engagement with the latch member 147 by a workman on the derrick floor.

The ratchet tooth 152 is disposed in a position to hold the latch member 147 in an initial position such as is shown in Fig. 11 in which the operating projection 149 is disposed in the path of movement of the cross shaft portion 146. The ratchet tooth 154 is positioned to hold the latch member 147 in the latched position which is illustrated in Fig. 12. The ratchet tooth 153 is disposd substantially midway between the teeth 152 and 154 and serves as a safety measure to prevent counterclockwise rotation of the latch member 147 in the event the pawl 155 fails to completely engage the ratchet tooth 154. Furthermore, the tooth 153 produces an audible click when it passes the pawl 155 during the movement of the cross shaft 117 to its final position seated within the notch 154, and thus serves to indicate to the workmen erecting the derrick that the final position of the structure is being closely approached.

As is best seen in Figs. 11 and 14, the frame plates 140 and 141 include upwardly extending portions 158 through which are extended aligned rectangular apertures 159. The latch member 147 includes a tailpiece 160 defining a plane surface 161 disposed in such location that rotation of the member 147 to the latched position shown in Fig. 12 moves the surface 161 to a position coplanar with the lower surface 162 of the rectangular opening 159. As will be described in the ensuing paragraphs, wedge members driven or forced into the rectangular apertures 159 engage the surface 161 so as to positively lock the latch member 147 against counterclockwise movement to a position which would release the cross shaft 117.

As is shown in Fig. 14, the wedging devices for providing a safety lock such as has just been described constitute a single instrumentality adapted to simultaneously lock the latch members 147 of both of the automatic latching devices. This instrumentality includes a pair of tapered wedge members 163 and 164, one for each of the latch members 147. The wedge members 163 and 164 are provided with a rectangular cross section to allow them to be readily but non-rotatably received within the rectangular openings 159. The taper of the members 163 and 164 is so arranged as to provide the desired wedging and locking action upon movement of these members outwardly away from each other as shown in Fig. 14.

The wedge member 163 is bored to receive a jackshaft 165 which is freely rotatable within the bore in the wedge member 163. The wedge member 163 is held against axial movement relative to the jackshaft 165 by means of an inner collar 166 which is secured to the shaft as by means of a pin or like device. A nut 167 or like member of polygonal cross section is similarly fixed on the outer end of the jackshaft 165 so as to confine the wedge member 163 between the nut 167 and the collar 166.

The right-hand end of the jackshaft 165 is threaded as shown at 168, and threadedly engages a threaded opening 169 provided in the wedge member 164. It will be seen that rotation of the jackshaft 165 will thus cause the wedge members 163 and 164 to move toward and away from each other between positions such as are alternatively shown in dotted and solid lines in Fig. 14. Such rotation of the jackshaft 165 may be effected manually as by means of a socket wrench 170 applied to the nut 167.

While the derrick structure is being shipped to the erection site, the lock-jack assembly just described is carried in a suitable box (not shown) secured to the side of the derrick structure near the intended place of use. To prevent the dropping or other loss of the lock-jack assembly, the same is preferably secured to the derrick structure as by means of a chain 171 secured at one end to the mast and at the other end to a collar 172 which is freely rotatable upon the jackshaft 165. The lock-jack assembly is stored with the wedge members 163 and 164 moved to positions as closely adjacent each other as the length of the thread 168 will permit, as is represented by the dotted line showing in Fig. 14.

When the derrick has been moved to the fully erected position so as to rotate the latch member 147 to the position shown in Fig. 12, the lock-jack assembly is then applied as a safety lock. This is accomplished by first passing the exposed threaded end of the jackshaft 165 through the rectangular openings in one pair of the frame members 140 and 141 as is represented by the dotted line showing in Fig. 14 with respect to the right-hand frame members. This positions the nut 167 inwardly of the frame 141 of the left-hand automatic latching mechanism so as to permit the lock-jack assembly to be angularly moved into alignment with the rectangular apertures therein and then slid axially to the left as viewed in Fig. 14 to move the wedge member 163 to the position shown in solid lines in that figure.

Thereafter, rotation of the nut 167 through the use of the wrench 170 will cause the wedge member 164 to move outwardly relative to the wedge member 163 and so into the right-hand rectangular opening. When both wedging members 163 and 164 are in place, additional force applied to the wrench 170 will wedge these members in their respective apertures and provide a positive safety lock which will prevent inadvertent movement of both of the latch members 147 toward their released positions.

When it is desired to lower the derrick as for transporting to a new location, the lock-jack assemblies are first removed by following a procedure which is the reverse of that just described. After the lock-jack assemblies are removed, the workmen descend to the derrick floor and a strain is taken on the hoisting mechanism through appropriate manipulation of the draw works. The flexible tension members 157 are then manually operated to withdraw the pawls 155, and cable is slowly payed off of the winding drum of the draw works. This allows the derrick to slowly move in a clockwise direction as viewed in Fig. 2, which causes the cross shaft 117 to move upwardly as viewed in Figs. 11 and 12. This movement of the cross shaft rotates the latch members 147 to their initial positions as shown in Fig. 11. The automatic latching mechanism for the raising legs 41 and 42 thus being released, the derrick may be lowered to a prone position by continuing to pay cable off of the winding drum of the draw works.

When the derrick finally reaches the prone position as shown in solid lines in Fig. 7, the rollers 118 engage a fixed stop member 99. The fixed stop member 99 is firmly secured to the mast 38 at the outer end of the trackway 82 and in a position to prevent further outward relative movement of the upper end of the raising leg 41 when the mast 38 reaches a substantially horizontal position. The stop 99 thus cooperates with the raising leg 41 to limit the amount of clockwise movement the mast may make in approaching the prone position to thereby limit to a definite minimum value the lever arm length of the erecting couple. It will be appreciated that this lever arm results from the force line to the outer end of the raising leg 41 from the pivot 78 being disposed a substantial distance above the pivot 43, and that the length of this lever arm would be reduced by clockwise rotation of the mast 38 beyond the described prone position. When the raising leg 41 engages the stop 99, the hoisting tackle goes slack, permitting the hook on the traveling block to be disengaged from the yoke 85.

When the derrick is first erected and is then to be put into normal use, it is of course necessary to disengage the traveling block 84 from the yoke 85. In the erected position of the derrick, the yoke 85 has been moved upwardly to a point near the top of the derrick, as may be seen by reference to Fig. 1. To disengage the raising sling comprising the yoke 85 and cables 88 and 89, the traveling block is lowered to the platform 49 at which point a workman may fasten one end of a sling stowage line 51a to the yoke 85. The sling stowage line extends upwardly to the water table where it passes over a sheave 52a, the free end of the sling stowage line falling to the derrick floor where it may be pulled, either manually or by passing the same around the cathead 53 to utilize the power of the draw works.

Upon pulling the free end of the sling stowage line, the raising sling is again elevated to a position such as that shown in Fig. 1, but by reason of the lateral displacement of the sheave over which the sling stowage line passes (see Fig. 2), the raising sling is caused to lie closely adjacent the draw works side of the derrick and in close relationship to the inside faces of the masts 38 and 39. When the raising sling has been elevated and positioned as described, the lower end of the sling raising line may be tied off to the bottom of the derrick in any suitable fashion. To prevent inadvertent interference between the raising sling and the normal up-and-down movements of the traveling block, the raising sling lines 88 and 89 may be temporarily secured to the column members of the masts by suitable hand lashing.

As may be seen at 180 in Fig. 2, the derrick structure is provided with a ladder extending from the derrick floor to the floor of the safety platform situated at the crown block 46. The ladder 180 is made up in individual sections corresponding in length to the length of the prefabricated mast sections 54—58, ad are secured to these sections in a manner to be described.

Each ladder comprises a pair of longitudinal members 181 and 182 between which are extended at suitable intervals rung members 183. As may best be seen in Fig. 1, during the normal use of the derrick structure the ladder must be spaced from the side face of the derrick a distance sufficient to permit ample toe room for workmen ascending and descending the ladder. However, when the derrick is knocked down for transport to a new location it is desired to save space by moving the ladder 180 into close abutting relation with the side of the derrick. In such a position, the ladder is protected against damage during handling and moving.

A folding structure for mounting the ladder is illustrated in Figs. 20 and 21 as comprising a plurality of links 184 pivotally secured at one end as by pivots 185 to the structural members of the mast and pivotally secured at the other end as by pivots 186 to the longitudinal ladder members 181 and 182. This mounting permits the ladder to be hingedly moved between the two positions shown respectively by the dotted lines and solid lines in Fig. 20.

Clockwise movement of the links 184 is arrested in the solid line position shown in Fig. 20 by the engagement of the ladder members 181-183 with the side panel of the mast. To limit counterclockwise movement of the links 184 to the position shown in dotted lines in Fig. 20, the lower pivot 185 preferably engages a clip member 187 which is suitably secured to one of the horizontal girts 74. When the link 184 is rotated to the position shown in dotted lines in Fig. 20, the undersurface of the link engages the upper surface of the girt 74 which then prevents further downward movement of the link.

Means are provided for locking the ladder in the folded position as shown in full lines in Fig. 20. This means comprises a bolt 188 which is passed through a suitable transversely extending aperture formed in a lug 189 welded or otherwise suitably formed on the outside surface of the links 184. The upper end of the bolt 188 is threaded to receive a wing nut or thumb nut 190, and the lower end of the bolt is headed as shown at 191. At suitable locations on the longitudinal ladder members 181 and 182 there are provided clip members 192 which comprise a pair of outwardly extending ears 193 defining therebetween a channel 194 for receiving the lower end of the shank of the bolt 188, the head 191 being positioned below and engaging the ears 193. Such a relation between the bolt and the clip 192 is shown in solid lines in Fig. 20.

When the bolt is engaged with the clip 192 in the manner described, the thumb nut 190 may be tightened to force relative rotation between the link 184 and the longitudinal ladder member 182. This forced rotation results in pulling the ladder into firm abutting engagement with the side face of the mast and serves to hold the ladder firmly in the folded position.

In transporting the derrick, it is desirable to leave the traveling block and crown block reeved, but it is necessary to hold the traveling block so as to prevent tangling or snarling of the traveling block line. Accordingly, the upper section 54 of the mast 39 is preferably provided with a plurality of longitudinally extending auxiliary members 195 which are secured to the girts and braces on the three outer surfaces of the mast 39. The auxiliary members 195 thus define a cradle within which the traveling block may be confined and held as by hand lashing or other suitable attachment.

In the interests of saving space when the derrick is to be transported from one location to another, the working platform 49 is detachably secured to the derrick structure, and is so constructed as to permit the detached platform assembly to be folded into a relatively small compact package. The construction of the platform 49 is illustrated in detail in Figs. 18 and 19.

The base or working floor of the platform 49 is defined by an outer frame member 200 of tubular form which is connected as by channel members 201 and 202 to a pair of inner frame members 203 and 204, the inner frame members 203 and 204 being coaxially disposed and extending across the pipe rack sides of the respective masts 38 and 39 to which the frame members 203 and 204 are detachably secured as by bolts 205 and clips 206. The frame members 203 and 204 are spaced apart axially to leave a gap therebetween through which the upper ends of stands of drill pipe resting on the derrick floor may be moved to bring them into the area defined by the outline of the platform 49. The members 203 and 204 are preferably of tubular form and have telescopically received therein sliding pins 207 which may be slid toward each other so as to close the aforementioned gap.

The floor of the platform comprises suitable metal plates resting upon and secured to the base framework just described. These plates, which are identified in Fig. 19 by the reference characters 208, 209, 210, and 211, define a C-shaped walkway around the outer perimeter of the platform area. The floor structure just described is preferably braced by means of a pair of inclined braces 212, secured at one end to the platform frame members 202 and secured at the other end as by means of bolts 213 and clips 214 to the column members of each of the masts.

The platform working area is completely enclosed by a safety railing which is made up of a center panel indicated generally at 215. The panel 215 is supported by posts 216, 217, and 218, which are in turn attached to the tubular base frame member 200 as by means of socket members 219. The members 219 are rotatable relative to the frame member 200 so as to permit the rear railing panel 215 to be folded down flat against the floor of the platform.

End panels 220 and 221 include inner posts 222, the lower ends of which merely rest upon the frame members 203, and outer posts 222 which are so secured to the posts 216 and 218 by clips 223 as to permit rotation of the posts 222 relative to the posts 216. This permits the end panels 220 and 221 to be folded inwardly against the outer panel 215 and in overlapping relation thereto and in relation to each other before the folded railing assembly is folded down against the floor of the platform itself.

The platform floor also includes a center catwalk portion 225. This portion is hingedly secured at its outer end as by means of hinges 226 to the horizontal frame member 200 to permit the catwalk to be folded up against the outer railing panel 215. The catwalk may be held in such folded position by means of a latch member 227 adapted to engage a suitable latch aperture 228 provided in the catwalk member 225. In its unlatched and lowered position as shown in Figs. 18 and 19, the catwalk 225 rests upon a horizontally extending frame member 229.

To facilitate the racking of stands of drill pipe a pair of racking rakes 230 and 231 are provided, these rakes each comprising a plurality of horizontally extending finger members suitably secured to the framework of the platform. It will be understood that stands of drill pipe may be slipped between the fingers of the rake and so held in a regularly arranged order.

It will be seen that the working platform construction just described provides ample working space and all of the facilities for racking the upper ends of stands of drill pipe, while at the same time being readily detachable from the derrick structure and foldable into a small package to facilitate transportion thereof.

In Fig. 22 there is shown an alternative construction for securing the water table assembly 40 to the upper end of the derrick. In this construction the socket members 69 are omitted and replaced by gusset plates 235 which are secured, preferably by welding, to the upper ends of the column members 70 and 71. A pair of pipe struts 236 are extended horizontally beneath the water table beams 63 and 64, and are permanently secured to the upper ends of the masts 38 and 39 as by being welded to the ends of the column members 70 and 71 and to the gusset plates 235. Diagonal braces 237 are extended between the pipe strut 236 and the column members 70 and 71 to increase the rigidity of the structure. Saddle blocks 238, welded in appropriate location to the underside of the water table beams 63 and 64, provide curved bearing surfaces for engaging the upper cylindrical surface of the pipe struts 236 at each end thereof. Shear blocks 239 may be welded to the upper surface of the pipe struts 236 to hold the water table beams 63 and 64 against endwise movement relative to the struts 236.

The water table beams 63 and 64 are clamped to the struts 236 by means of U-bolts 240 which pass through suitable apertures in the underside flanges of the water table beams, and are held in place as by means of nuts 241. By tightening the nuts 241, the water table beams 64 are firmly and securely clamped to the pipe struts 236.

When it is desired to pivotally move the masts 38 and 39 toward each other as described hereinbefore, the U-bolts 240 are loosened to permit the pipe struts 236 to rotate relative to the water table beams 63 and 64.

The alternative construction described with reference to Fig. 22 is somewhat less expensive to construct than that shown in Fig. 17, and provides an adequately strong attachment of the water table structure to the upper end of the derrick.

In Fig. 23 there is illustrated a modified form of raising leg pivot assembly 43 which employs a self-aligning bushing instead of the trunnion construction heretofore described with reference to Fig. 10. As is shown in Fig. 23, the channel members 100 defining the raising leg 41 may be secured to an annular bearing block 245. The bearing block 245 is provided with a large central aperture 246 within which is pressed or otherwise suitably retained an outer member 247 forming a part of a self-aligning bushing, the other part of the bushing comprising an inner member 248.

The members 247 and 248 are interengaged along a spherical surface 249 is a conventional and well known manner to provide a universal action between these members. The inner member 248 is bored to receive the pivot pin 105, and may be held centrally between the upstanding arms 106 and 107 of the base shoe 108 as by means of spacer sleeves 250.

It will be seen that with the construction described, the raising leg 41 is mounted for pivotal movement about the axis of the pivot 105, while at the same time permitted to enjoy pivotal movement in the plane of the figure, this latter pivotal movement being permitted by the self-aligning bushing 247, 248 which permits the member 247 to rotate about the spherical surface 249.

The aforementioned alternative construction of the removable back strut 76 and the construction of the fast line stabilizer 76a is illustrated in Fig. 24. As is shown therein, the strut 76 may comprise a suitable length of structural steel I-beam which is secured to the draw works faces of each of the masts 38 and 39 as by being bolted to the column members 70 and 71 thereof, as is indicated at 255. This form of attachment allows the strut 76 to be shipped separately and attached to the masts 38 and 39 during field assembly while the derrick is in a prone position.

The fast line stabilizer 76a preferably comprises a framework defined by a pair of angle members 256 and 257 which are held in parallel spaced relation to each other by a transverse angle 258 suitably secured as by welding to the angles 256 and 257. The frame thus defined rests on the upper surface of the flanges of the back strut 76, and may be firmly affixed thereto by means of four J-bolts 259 which pass downwardly along the outer surfaces of the flanges and hook under the lower edges thereof. Nuts applied to the upper ends of the J-bolts permit the frame to be clamped securely to the strut 76. Preferably, the angle members 256 and 257 are provided with a plurality of holes spaced along their lengths for receiving the J-bolts 259 in a plurality of positions, of the frame relative to the strut 76.

Between the outwardly extending arms of the angles 256 and 257 there are mounted a pair of rollers 260, 261. These rollers are journaled for free rotation as by means of pintles 262 extended through suitable bearing apertures formed in the upstanding flanges of the angles 256 and 257. The rollers 260, 261 are spaced apart to define between their adjacently disposed cylindrical surfaces a small space for receiving the fast line 45.

The fast line stabilizer 76a is thus adapted to be attached to the assembled derrick at the same time that the back strut 76 is attached thereto. The fast line stabilizer 76a serves to guide the fast line 45, and prevent whipping thereof during drilling operations.

From the foregoing, it will be observed that this invention provides a self-erecting transportable derrick which is particularly adapted for shipment and erection at the drilling site. It will also be seen that the device is so constructed as to permit the derrick to be readily transported from one drilling location to another. In this connection it should be observed that for relatively short distances the entire upper section of the derrick may be handled as a unit consisting of the top sections 54, together with the water table 40 and crown block assembly 46 atttached thereto. When the device is shipped as a sub-assembly in this fashion, the X-brace member 73 is disconnected from one of the masts. This permits the two mast sections to be pivotally moved about the pins 72 into abutting relation with each other, where they may be secured by suitable means and in which relative poistions they occupy a minimum of space.

Attention is also directed to the fact that the erecting means comprising the raising legs 41 to 42 operate as structural elements of the derrick during the normal use of the derrick, and are self-contained within their respective masts during the time that the derrick is being transported from one location to another. An outstanding characteristic of the construction described herein is in the substantially complete elimination of auxiliary mechanisms for raising and lowering the derrick. Instead, the members used in the structure of the operating derrick are employed as the raising means without the use of auxiliary A-frames, gin poles or like devices. An important feature in connection with the use of the raising legs 41 and 42 for the erection of the derrick resides in positioning the derrick base pivots above the raising leg pivots so as to provide a substantial lever arm for translating the tension forces developed by the raising sling into a couple tending to rotate the raising legs.

It should also be noted that when the derrick is erected, the raising legs extend angularly downward and away from the pipe rack side of the derrick to define a high inverted V window to facilitate drawing in pipe and like equipment from the side of the derrick.

The difference in elevation between the derrick base pivots and the raising leg pivots just mentioned is obtained by mounting the derrick base pivots on the top of the derrick base pedestals. Attention is directed to the fact that the bracing for these pedestals extends away from the derrick floor space so as to obviate any interference with the drilling operations which are conducted within that floor space. Also worthy of note is the fact that the entire raising tackle is housed within the confines of the masts with which they are associated, thus materially facilitating the transportation of the equipment from one well site to another.

The structure described has adequate strength and rigidity to permit its use in the drilling of deep wells. By reason of such strength and rigidity, and because the erected derrick stands upon a base of ample size, no guys are required as is the case with the self-erecting derricks known prior to this invention.

Finally, it is desired to call attention to the automatic latch and safety lock mechanism for holding the derrick in its erected position, and also to the fact that in moving from the prone position to the erected position the derrick does not cross the top dead center position, thus obviating many of the disadvantageous features of the prior constructions.

While the preferred embodiment of this invention has been illustrated and described herein, the invention is not to be limited to the details of construction shown and described, except as defined in the appended claims.

We claim:

1. In a drilling derrick, the combination of: a pair of upwardly extending masts disposed in spaced relation; a water table structure at the upper ends of said masts; means pivotally connecting the upper end of each of said masts to said water table structure to permit the lower ends of said masts to be moved toward and away from each other; a horizontal working platform on said derrick below said water table extending between said masts; means detachably securing one side edge of said platform to both of said masts, whereby said platform serves as a cross tie member to hold said masts in fixed positions relative to each other; a guard rail extending upwardly from the other edges of said platform; and means hingedly securing said guard rail to said platform, whereby said guard rail may be folded down flat on said platform and said platform removed from said derrick and said masts moved together into substantially abutting parallelism when it is desired to transport said derrick to a different location.

2. In a drilling derrick surmounted by a crown block reeved by cables to a traveling block depending from said crown block, the combination of: a pair of masts of polygonal cross section, each including column members disposed at the corners of said polygonal cross section and held in fixed positions relative to each other by a system of horizontal girts and diagonal braces extending between adjacent column members and defining mast faces, the upper ends of said masts being adjacently disposed to bring the inner faces of said masts into substantially abutting relation and the lower ends of said masts being spaced apart to define between the lower portions of said inner faces a working space for receiving said traveling block; and a water table secured to the upper ends of said masts for supporting said crown block, said system of girts and braces being applied to all other faces of said masts and to the lower portions only of said inner faces, the upper portions of said inner faces being free of said girts and braces to permit said traveling block to enter the cross sectional confines of said masts as said traveling block approaches said crown block.

3. In a drilling derrick surmounted by a crown block, reeved by cables to a traveling block depending from said crown block, the combination of: a pair of masts of rectangular cross-section, each including column members disposed at the corners of said rectangular cross-section and held in fixed positions relative to each other by a system of horizontal girts and diagonal braces extending between adjacent columns and defining an inner mast face and three other mast faces, the upper ends of said masts being adjacently disposed to bring said inner mast faces into substantial abutting relation, the lower ends of said masts being spaced apart to define between the lower portions of said inner faces a working space for receiving said traveling block; and a water table secured to the upper ends of said masts for supporting said crown block, said system of girts and braces being applied to said three other mast faces and to the lower portions only of said inner mast faces, the upper portions of said inner mast faces being free of said girts and braces to permit said traveling block to enter the cross-sectional confines of said masts as said traveling block approaches said crown block.

4. In a drilling derrick, the combination of: a pair of upwardly extending masts of rectangular cross-section disposed in spaced relation, the lower ends of said masts being normally spaced apart a distance exceeding the spacing of the upper ends thereof, each of said masts comprising two pairs of columns, said columns being disposed at the corners of said rectangular cross-section and held in fixed positions relative to each other by a system of horizontal girts and diagonal braces extending between adjacent columns, the upper ends of the columns of each of said pair being inclined toward each other and meeting at their upper ends; a water table structure at the upper ends of said masts, said water table structure including a pair of water table beams, one for each of said masts; a hinge member secured to each end of each of said beams and depending therefrom; corresponding cooperating hinge members secured to the meeting upper ends of each of said pairs of columns; and pivot pins pivotally interconnecting each of said hinge members with the corresponding cooperating hinge member, whereby the lower ends of said masts may be moved toward each other to dispose said masts in substantially abutting parallelism.

5. In a drilling derrick, the combination of: a pair of upwardly extending masts of rectangular cross-section disposed in spaced relation, the lower ends of said masts being normally spaced apart a distance exceeding the spacing between the upper ends thereof, each of said masts comprising two pairs of columns, said columns being disposed at the corners of said rectangular cross-section and held in fixed positions relative to each other by a system of horizontal girts and diagonal braces extending between adjacent columns, the upper ends of the columns of each pair being inclined toward each other and meeting at their upper ends; a cylindrical horizontal beam at the upper end of each of said masts, the ends of said beam being secured to said meeting upper ends of said columns; a water table structure at the upper ends of said masts, said water table structure including a pair of water table beams, one for each of said masts, said water table beams being disposed above and parallel to said cylindrical beams and resting thereupon; and releasable clamp means encircling said cylindrical beams and securing said water table means thereto, release of said clamp means permitting rotation of said cylindrical beams relative to said water table beams, whereby the lower ends of said masts may be moved toward each other to dispose said masts in substantial abutting parallelism.

6. In a drilling derrick, the combination of: a pair of upwardly extending masts of rectangular cross-section disposed in spaced relation, the lower ends of said masts being normally spaced apart a distance exceeding the spacing of the upper ends thereof, each of said masts comprising two pairs of columns, said columns being disposed at the corners of said rectangular cross-section and held in fixed positions relative to each other by a system of horizontal girts and diagonal braces extending between adjacent columns, the upper ends of the columns of each pair being inclined toward each other and meeting at their upper ends; a bifurcated socket member secured to each of said meeting pairs of columns, said socket members having horizontally aligned pin receiving apertures therethrough; a water table structure at the upper ends of said masts, said water table structure including a pair of table beams, one for each of said masts; vertical plate members secured to the ends of said water table beams and extending downwardly into said bifurcated socket members, the lower ends of said plate members having apertures aligned with said pin receiving apertures; and pivot pins in said apertures pivotally securing said masts to said water table beams, whereby the lower ends of said masts may be moved toward each other to dispose said masts in substantial abutting parallelism.

7. In a drilling derrick, the combination of: a pair of upwardly extending masts of rectangular cross-section disposed in spaced relation, the lower ends of said masts being normally spaced apart a distance exceeding the spacing of the upper ends thereof, each of said masts comprising two pairs of columns, said columns being disposed at the corners of said rectangular cross-section and held in fixed positions relative to each other by a system of horizontal girts and diagonal braces extending between adjacent columns, the upper ends of the columns of each pair being inclined toward each other and meeting at their upper ends; a cylindrical horizontal beam at the upper end of each of said masts, the ends of said beam being secured to said meeting upper ends of said columns; a water table structure at the upper ends of said masts, said water table structure including a pair of water table beams, one for each of said masts; a crown block beam and pedestal assembly extending between said water table beams and secured thereto, said water table beams being disposed above and parallel to said cylindrical beams and resting thereupon; and U-bolts encircling said cylindrical beams and securing said water table beams thereto, loosening of said U-bolts permitting rotation of said cylindrical beams relative to said water table beams, whereby the lower ends of said masts may be moved toward each other to dispose said masts in substantial abutting parallelism.

8. In a drilling derrick surmounted by a crown block reeved by cables to a travelling block depending from said crown block the combination of: a fixed base; a pair of generally upwardly extending raising legs having their lower ends pivotally affixed to said base; a pair of upwardly extending masts of rectangular cross-section disposed in spaced relation, the lower ends of said masts being normally spaced sidewardly apart a distance exceeding the spacing of the upper ends thereof with the lower ends of said masts being pivotally affixed to said base forwardly of the lower ends of said raising legs and with the upper ends of said raising legs being pivotally attached to the lower portion of said masts at a point spaced above said base, each of said masts comprising a pair of columns, said columns being disposed in parallelism as viewed from either side of said derrick at least above the point of attachment of the upper end of said raising leg to said masts but with the upper ends of said columns of each of said pair being inclined towards each other and meeting at their upper ends as viewed from the front of said derrick, said column members further being held in fixed positions relative to each other by a system of horizontal girts and diagonal braces extending between adjacent column members and defining mast faces, the upper ends of said masts being adjacently disposed to bring the inner faces of said masts into substantial abutting relation and spaced closer together at their most proximate point than the width of said crown block; and a water table secured to the upper ends of said masts for supporting said crown block, said system of girts and braces being applied to all outer faces of said masts and to the lower portions only of said inner faces, the upper portions of said inner faces being free of said girts and braces to permit said travelling block to enter the cross-sectional confines of said masts as said travelling block approaches said crown block.

9. In a drilling derrick surmounted by a crown block reeved by cables to a travelling block depending from said crown block the combination of: a fixed base; a pair of generally upwardly extending raising legs having their lower ends pivotally affixed to said base; a pair of upwardly extending masts of rectangular cross-section disposed in spaced relation, the lower ends of said masts being normally spaced sidewardly apart a distance exceeding the spacing of the upper ends thereof with the lower ends of said masts being pivotally affixed to said base forwardly of the lower ends of said raising legs and with the upper ends of said raising legs being pivotally attached to the lower portion of said masts at a point spaced above said base, each of said masts comprising a pair of columns, said columns being disposed in parallelism as viewed from either side of said derrick at least above the point of attachment of the upper end of said raising legs to said masts but with the upper ends of said columns of each of said pair being inclined towards each other and meeting at their upper ends as viewed from the front of said derrick, said column members further being held in fixed positions relative to each other by a system of horizontal girts and diagonal braces extending between adjacent column members and defining mast faces, the upper ends of said masts being adjacently disposed to bring the inner faces of said masts into substantial abutting relation and spaced closer together at their most proximate point than the width of said crown block; a water table structure at the upper ends of said masts, said water table structure including a pair of water table beams, one for each of said masts; a hinge member secured to each end of said beams and depending therefrom; corresponding cooperating hinge members secured to the meeting upper ends of each of said pair of columns; and pivot pins pivotally connecting each of said hinge members with the corresponding cooperating hinge member whereby the lower ends of said masts may be moved sidewardly towards each other to dispose said masts in substantially abutting parallelism.

10. In a drilling derrick surmounted by a crown block reeved by cables to a travelling block depending from said crown block the combination of: a fixed base; a pair of generally upwardly extending raising legs having their lower ends pivotally affixed to said base; a pair of upwardly extending masts of rectangular cross-section disposed in spaced relation, the lower ends of said masts being normally spaced sidewardly apart a distance exceeding the spacing of the upper ends thereof with the lower ends of said masts being pivotally affixed to said base forwardly of the lower ends of said raising legs and with the upper ends of said raising legs being pivotally attached to the lower portion of said masts at a point spaced above said base, each of said masts comprising a pair of columns, said columns being disposed in parallelism as viewed from either side of said derrick at least above the point of attachment of the upper end of said raising legs to said masts but with the upper ends of said columns of each of said pair being inclined towards each other and meeting at their upper ends as viewed from the front of said derrick, said column members further being held in fixed positions relative to each other by a system of horizontal girts and diagonal braces extending between adjacent column members and defining mast faces, the upper ends of said masts being adjacently disposed to bring the inner faces of said masts into substantial abutting relation and spaced closer together at their most proximate point than the width of said crown block; a cylindrical horizontal beam at the upper end of each of said masts, the ends of said beam being secured to said meeting upper ends of said columns; a water table structure at the upper ends of said masts, said water table structure including a pair of water table beams, one for each of said masts, said water table beams being disposed above and parallel to said cylindrical beams and resting thereupon; and releasable clamp means encircling said cylindrical beams and securing said water table beams thereto, release of said clamp means permitting rotation of said cylindrical beams relative to said water table beams whereby the lower ends of said masts may be moved sidewardly towards each other to dispose said masts in substantially abutting parallelism.

11. In a drilling derrick surmounted by a crown block reeved by cables to a travelling block depending from said crown block the combination of: a fixed base; a pair of generally upwardly extending raising legs having their lower ends pivotally affixed to said base; a pair of upwardly extending masts of rectangular cross-section disposed in spaced relation, the lower ends of said masts being normally spaced sidewardly apart a distance exceeding the spacing of the upper ends thereof with the lower ends of said masts being pivotally affixed to said base forwardly of the lower ends of said rasing legs and with the upper ends of said raising legs being pivotally attached to the lower portion of said masts at a point spaced above said base, each of said masts comprising a pair of columns, said columns being disposed in parallelism as viewed from either side of said derrick at least above the point of attachment of the upper end of said raising legs to said masts but with the upper ends of said columns of each of said pair being inclined towards each other and meeting at their upper ends as viewed from the front of said derrick, said column members further being held in fixed positions relative to each other by a system of horizontal girts and diagonal braces extending between adjacent column members and defining mast faces, the upper ends of said masts being adjacently disposed to bring the inner faces of said masts into substantial abutting relation and spaced closer together at their most proximate point than the width of said crown block; a cylindrical horizontal beam at the upper end of each of said masts, the ends of said beam being secured to said meeting upper ends of said columns; a water table structure at the upper ends of said masts, said water table structure including a pair of water table beams, one for each of said masts; a crown block beam and pedestal assembly extending between said water table beams and secured thereto, said water table beams being disposed above and parallel to said cylindrical beams and resting thereupon; and U-bolts encircling said cylindrical beams and securing said water table beams thereto, loosening of said U-bolts permitting rotation of said cylindrical beams relative to said water table beams, whereby the lower ends of said masts may be moved toward each other to dispose said masts in substantial abutting parallelism.

References Cited in the file of this patent

UNITED STATES PATENTS

| | | |
|---|---|---|
| 1,054,737 | Woodbury et al. | Mar. 4, 1913 |
| 1,819,031 | Kuhlman | Aug. 18, 1931 |
| 2,283,049 | Cormier | May 12, 1942 |
| 2,336,432 | Wilson | Dec. 7, 1943 |
| 2,345,253 | Funk | Mar. 28, 1944 |
| 2,421,913 | Stoddard | June 10, 1947 |
| 2,597,958 | Slater | May 27, 1952 |

UNITED STATES PATENT OFFICE
CERTIFICATE OF CORRECTION

Patent No. 2,983,341                              May 9, 1961

John P. Selberg et al.

It is hereby certified that error appears in the above numbered patent requiring correction and that the said Letters Patent should read as corrected below.

Column 18, line 7, for "other" read -- outer --; column 19, line 3, for "means" read -- beams --.

Signed and sealed this 21st day of November 1961.

(SEAL)
Attest:

ERNEST W. SWIDER                          DAVID L. LADD
Attesting Officer                            Commissioner of Patents